Nov. 30, 1937.　　　　E. C. HORTON　　　　2,100,334
INDICATOR
Filed May 1, 1936

INVENTOR
Erwin C. Horton,
BY
Beau, Brooks, Buckley & Beau.
ATTORNEYS

Patented Nov. 30, 1937

2,100,334

UNITED STATES PATENT OFFICE 2,100,334

INDICATOR

Erwin C. Horton, Hamburg, N. Y., assignor to Trico Products Corporation, Buffalo, N. Y.

Application May 1, 1936, Serial No. 77,457

5 Claims. (Cl. 33—209)

This invention relates to an indicator, and particularly to a device for indicating the grade of inclination upon which a vehicle may be standing or traveling, as well as a means for indicating the degree of acceleration or deceleration which may take place in the travel of the vehicle.

Devices of this nature have heretofore been designed for attachment to the instrument panel of a motor vehicle but their constructions have been of such a nature as to require mutilation of the instrument panel in mounting the same. This not only involved an item of expense regarding the installation of such devices but it also injured the instrument board beyond repair, should the accessory thereafter be removed.

The object of the present invention is to provide an accessory of this nature which is practical in design and may readily be attached to the motor vehicle without altering the construction thereof. Further, the invention is found to reside in the structural features by which the attachment of the indicator is facilitated, reference being had to the accompanying drawing wherein.

Figure 1:
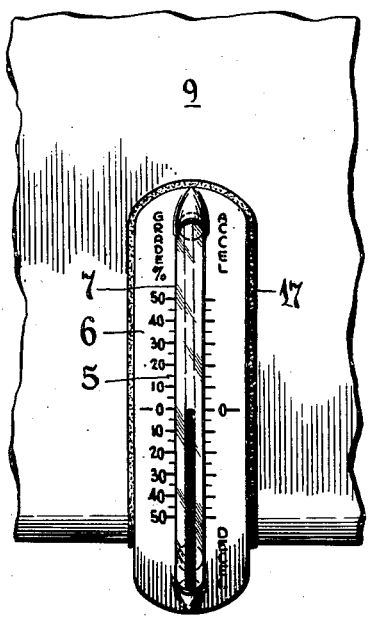
Fig. 1 is a front elevation of the indicator mounted in position upon a motor vehicle instrument panel, the latter being shown in fragment.
Figure 2:
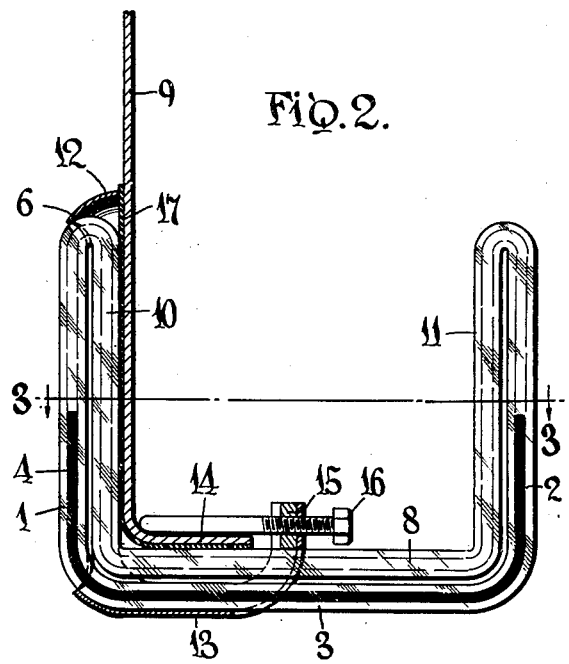
Fig. 2 is a vertical section therethrough further showing the construction of the indicator and illustrating the manner of attaching it to the panel.
Figure 4:
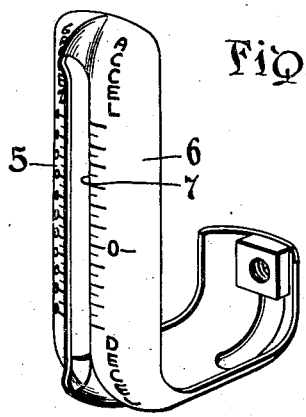
Fig. 4 is a perspective view of the indicator housing.
Figure 3:
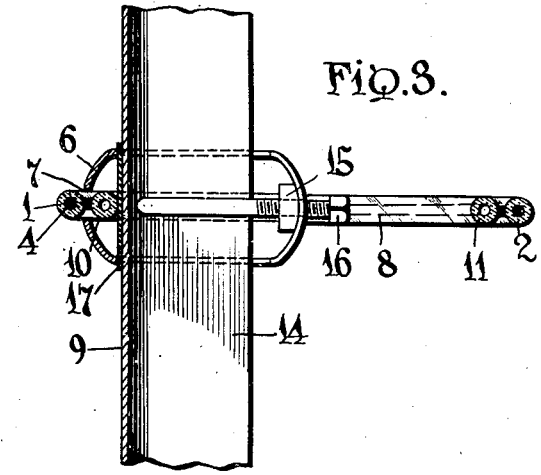
Fig. 3 is a horizontal section taken about on line 3—3 of Fig. 2.

Referring more particularly to the drawing, the grade or acceleration indicator comprises a tubular body consisting of a glass tube substantially U-shaped in design to form upstanding portions or legs 1 and 2 connected by a horizontal portion 3. The tubular body contains a liquid indicating body which stands in the upright legs 1 and 2 to the same level. A casing 6 is preferably provided with a slot 7 through which the front leg 1 is exposed, and each edge of the slot may be graduated to provide a scale 5, one for indicating the grade or inclination of the road and the companion scale for indicating the acceleration and deceleration of the vehicle speed. The liquid will be of any approved character which will not congeal nor measurably change its volume under climatic changes, so as to insure accuracy of indication at all times. Upon a sudden change in the speed of the vehicle the inertia of the liquid body will cause a rise or fall of the liquid level in the front leg 1 to thereby register the degree of acceleration or deceleration in the travel of the vehicle. A change in the grade of the road will likewise register by the rise or fall of the liquid column.

To avoid loss of the indicating liquid and at the same time to insure an equalization of pressure on the liquid in the two legs 1 and 2, the upper ends of the latter are rendered intercommunicating by a pressure equalizing passage 8, and to facilitate the mounting of the indicator on the instrument panel 9 without cutting a hole through the same or otherwise mutilating it beyond repair, should the indicator ever be removed from the vehicle, this pressure equalizing passage is caused to follow the general U-shaped contour of the indicating tubular body comprising the portions 1, 2 and 3. The pressure equalizing passage may likewise be formed of a glass tube with the upper ends of its upright portions 10 and 11 connected with the corresponding ends of the legs 1 and 2 of the indicating body. Preferably this connection is an integral one and for this reason the entire structure, including the tubular body as well as the equalizing passage, may be formed of a single glass tube so that the resulting structure may be said to comprise an endless glass tube formed of two U-shaped parts, which parts communicate at the upper ends of the upright leg portions, and one of the U-shaped members containing an indicating liquid. It is, therefore, obvious that as the liquid rises or falls in the indicating leg 1, the air column above the liquid and in the equalizing passage 8 will correspondingly be shifted.

The indicator housing or casing 6 is preferably of hollow construction so as to provide a chamber 12 in which the upright portion 10 of the pressure equalizing passage 8 may be housed and concealed from view. This exposes only the liquid contained indicating tube portion 1 whereby the reading of the level of the liquid may be readily made with respect to the scales 5. The lower part of the housing 6 is formed with a rearward extension 13 for providing support for the horizontal portion 3. Behind the instrument panel the extension 13 is turned upwardly to receive a set screw 16 for engaging over the flange 14 in securing the indicator to the instrument panel. A protective layer 17 of felt or the like may be interposed beneath the housing 6 and the front face of the instrument panel to avoid marring the finish of the latter. It is obvious from the foregoing that a unitary and completely closed tubular body is provided for the indicator which may be mounted and demounted upon the instrument panel without cutting holes or recesses in the latter or otherwise mutilating the same. Consequently, if it is ever desired to remove the indicating instrument from the panel, the same may be accomplished without leaving the instrument panel in a marred and unsightly condition. Obviously, the instrument may be attached to other ledges or parts of the vehicle, and while the foregoing description has been given in detail, it is not intended thereby to restrict the appended claims, since it is obvious that the inventive principles here involved are capable of embodiment in other physical forms without departing from the spirit or scope of the invention.

What is claimed is:

1. An indicator for mounting on the instrument panel of motor vehicles, or the like, comprising, in combination with the instrument panel, a tubular indicator body of substantially U-shape providing front and back upright legs, an indicating liquid contained within the body for registering an indication in the front leg, means for mounting the indicator body on the instrument panel with the front and back legs straddling the latter, and an equalizing passage connecting the upper portions of the upright legs and conforming substantially in shape to that of the tubular indicator body to straddle the instrument panel therewith.

2. An indicator for mounting on the instrument panels of motor vehicles, and the like, comprising a tubular indicating body of substantially U-shape for providing front and rear legs joined by a bottom connecting portion, an indicating liquid in the body, a substantially similarly shaped pressure equalizing passage having front and rear legs communicating respectively with the upper ends of the first legs, the legs of the equalizing passage being joined by a bottom connecting portion, the two bottom connecting portions being arranged together whereby the indicator as an entirety may be passed upwardly in straddle relation over the lower edge of the instrument panel with the front leg and the corresponding leg of the equalizing passage disposed in front of the instrument panel and the rear leg and its companion part of the equalizing passage behind the instrument panel in concealment, and means for mounting the body and equalizing passage as a unit.

3. An indicator for motor vehicles, and the like, comprising a tubular indicating body formed with front and rear upright legs joined by a bottom connecting portion, a similarly shaped pressure equalizing passage having front and rear legs joined by a bottom portion and communicating with the upper end portions of the legs, the body and its equalizing passage forming a generally U-shaped unit for straddling the lower edge of the vehicle instrument panel, an indicating liquid in the indicating body, a housing for the front leg of the unit provided with an opening exposing only the front leg of the body, said housing having a part extending beneath the instrument panel, and means for attaching the housing to the panel.

4. An indicator for mounting on the instrument panels of motor vehicles, and the like, comprising a tubular indicating body of substantially U-shape providing front and rear upright legs joined by a bottom connecting portion, a similarly shaped pressure equalizing passage communicating with the upper ends of the legs, and having its front leg arranged behind the front leg of the body, the equalizing passage and the indicator body being formed as a unit from a single length of glass tubing, an indicating liquid in the indicator body, a scale for reading the level of the liquid in the front leg of the body, and means for attaching the unit to the panel.

5. An indicator for mounting on the instrument panels of motor vehicles, and the like, comprising a tubular indicating body of substantially U-shape providing front and rear upright legs joined by a bottom connecting portion, a similarly shaped pressure equalizing passage nesting in the U-body and communicating with the upper ends of the legs, the equalizing passage and the indicator body being formed as a unit from a single length of glass tubing with the legs of the passage being arranged between and in the plane of the legs of the body, an indicating liquid in the indicator body, said body and passage being adapted for passing upwardly over the lower edge of the panel, and means for attaching the unit to the panel.

ERWIN C. HORTON.